US012767263B2

(12) United States Patent
Gu et al.

(10) Patent No.: US 12,767,263 B2
(45) Date of Patent: Oct. 20, 2026

(54) BICYCLE FORK STRUCTURE

(71) Applicant: TIEN HSIN INDUSTRIES CO., LTD., Taichung City (TW)

(72) Inventors: Fong-Syuan Gu, Taichung City (TW); Kuang-Yang Liao, Taichung City (TW)

(73) Assignee: TIEN HSIN INDUSTRIES CO., LTD., Taichung City (TW)

( * ) Notice: Subject to any disclaimer, the term of this patent is extended or adjusted under 35 U.S.C. 154(b) by 274 days.

(21) Appl. No.: 18/653,988

(22) Filed: May 3, 2024

(65) Prior Publication Data

US 2024/0367746 A1 Nov. 7, 2024

(30) Foreign Application Priority Data

May 4, 2023 (TW) ................................ 112204343

(51) Int. Cl.

| | |
|---|---|
| ***B62K 21/02*** | (2006.01) |
| ***B62J 11/10*** | (2020.01) |
| ***B62J 11/13*** | (2020.01) |
| ***B62K 21/04*** | (2006.01) |
| ***B62K 21/18*** | (2006.01) |

(52) U.S. Cl.
CPC .................................... *B62K 21/04* (2013.01)

(58) Field of Classification Search
CPC ........ B62K 21/02; B62K 21/12; B62K 21/18; B62J 11/10; B62J 11/13; B62J 11/16; B62J 11/19
USPC ................................ 74/551.8; 280/279, 280
See application file for complete search history.

(56) References Cited

U.S. PATENT DOCUMENTS 7,566,065 B2 * 7/2009 Fukui ..................... B62K 19/38 280/281.1
9,174,695 B1 * 11/2015 Wang .................... F16C 19/163
2013/0340564 A1 * 12/2013 Meggiolan ............... B62J 11/13 74/551.8

(Continued)

FOREIGN PATENT DOCUMENTS

CN 108058777 A * 5/2018 .............. B62J 11/13
CN 207311738 U * 5/2018

(Continued)

OTHER PUBLICATIONS

English translation of DE202022100922, Scott Sports, Feb. 23, 2022 (Year: 2022).*

*Primary Examiner* — Anne Marie M Boehler
(74) *Attorney, Agent, or Firm* — Apex Juris, pllc; Hilde M. L. Coeckx

(57) ABSTRACT

A bicycle fork structure is a fork including a steerer tube, a first crown, and a second crown that are integrally formed as a monolithic unit. An end of the steerer tube opens along a vertical direction to form a slot with two openings that are respectively located on two sides of the slot. Another end of the steerer tube is connected to an end of the first crown and an end of the second crown. The first crown and the second crown are respectively located on another two sides of the slot that are not provided with the two openings. The slot is adapted to receive at least one controlling cable. With the slot having the two openings on the two sides of the slot, the controlling cable could conveniently pass from a stem to a frame, thereby casing the difficulty in hiding the controlling cable.

8 Claims, 10 Drawing Sheets

(56) References Cited

U.S. PATENT DOCUMENTS

| | | | | |
|---|---|---|---|---|
| 2015/0367825 | A1 * | 12/2015 | D'Aluisio | B62K 19/06 29/428 |
| 2018/0273132 | A1 * | 9/2018 | Huang | B62K 21/18 |
| 2023/0035326 | A1 * | 2/2023 | Conradt | B62K 21/02 |
| 2023/0068536 | A1 * | 3/2023 | Anderer | B62J 11/10 |
| 2025/0002113 | A1 * | 1/2025 | Basaldua | B62J 11/13 |

FOREIGN PATENT DOCUMENTS

| | | | | |
|---|---|---|---|---|
| DE | 202020100238 | U1 * | 4/2021 | B62J 11/13 |
| DE | 202022100922 | U1 * | 2/2022 | B62K 19/32 |
| DE | 102022130638 | A1 * | 5/2024 | B62K 21/04 |
| GB | 2494714 | A * | 3/2013 | B62J 11/13 |

* cited by examiner

BICYCLE FORK STRUCTURE

BACKGROUND OF THE INVENTION

Technical Field

The present disclosure relates generally to a technical field of a bicycle, and more particularly to a bicycle fork structure, wherein controlling cables of the bicycle could pass through the bicycle fork structure and be completely hidden inside the bicycle fork structure when the bicycle is assembled.

Description of Related Art

Generally, controlling cables, which are used for braking or shifting, are disposed along a pathway, including a handlebar, a stem, a headtube, a fork, a frame. Although conventionally the controlling cables are fixed by using a tie, the controlling cables could not be effectively hidden by using the tie, such that the controlling cables are exposed outside the bicycle. When the controlling cables are subjected to wind, rain, and sunlight for a long period of time, degradation, rusting, breakage, etc, could be easily resulted, causing dangers in using the bicycle.

Nowadays, the controlling cables typically pass into the handlebar, the stem, the fork, and the frame. However, the fork is disposed vertical to the stem and an angle is provided between the fork and the frame, so that it is difficult for the controlling cables to pass from an interior of the stem to an interior of the fork and an interior of the frame. Moreover, when the number of the controlling cables increases, the difficulty in hiding the controlling cables is enhanced.

BRIEF SUMMARY OF THE INVENTION

In view of the above, the primary objective of the present disclosure is to provide a bicycle fork structure, wherein the bicycle fork structure is a fork including a steerer tube, a first crown, and a second crown that are integrally formed as a monolithic unit. The fork is made of carbon fibers. An end of the steerer tube opens along a vertical direction to form a slot with two openings that are respectively located on two sides of the slot. Another end of the steerer tube is connected to an end of the first crown and an end of the second crown. The first crown and the second crown are respectively located on another two sides of the slot that are not provided with the two openings. The slot is adapted to receive at least one controlling cable.

In an embodiment, the steerer tube forms a first divided tube and a second divided tube respectively on the another two sides of the slot. A plurality of restricting grooves recesses along a lateral direction into the first divided tube and the second divided tube and is arranged along the vertical direction. The restricting grooves on the first divided tube correspond to the restricting grooves on the second divided tube. A restricting member is engaged with at least one group of the restricting grooves. A restricting hole penetrates through the restricting member along the vertical direction. A cover is disposed on a top of the first divided tube and a top of the second divided tube. The cover is restricted in the restricting hole by a fixing member.

In an embodiment, the steerer tube forms a first divided tube and a second divided tube respectively on the another two sides of the slot. A U-shaped core is disposed on a surface of the first divided tube and a surface of the second divided tube that are adjacent to each other. The U-shaped core is made of metal. A plurality of restricting grooves with the same radius is formed by recessing in a lateral direction into a surface of the U-shaped core and is arranged along the vertical direction. A restricting member is engaged with at least one group of the restricting grooves that is corresponding. Two side edges of the restricting member corresponding to the restricting grooves form a plurality of protrusions. The protrusions are correspondingly disposed in the restricting grooves. A restricting hole penetrates through the restricting member along the vertical direction. A cover is disposed on a top of the first divided tube and a top of the second divided tube. The cover is restricted in the restricting hole by a fixing member.

In an embodiment, the steerer tube forms a first divided tube and a second divided tube respectively on the another two sides of the slot. A plurality of third through holes penetrates through the first divided tube along a lateral direction and is arranged along the vertical direction. A plurality of fourth through holes penetrates through the second divided tube along the lateral direction and is arranged in correspondence to positions of the third through holes. An inserting member is disposed between at least one of the third through holes and at least one of the fourth through holes that corresponds to the at least one third through hole of the through holes. An inserting hole penetrates through the inserting member along the vertical direction. A cover is disposed on a top of the first divided tube and a top of the second divided tube. The cover is restricted in the inserting hole by a fixing member.

In an embodiment, a first through hole penetrates through the first divided tube along the vertical direction. A second through hole penetrates through the second divided tube along the vertical direction. The first through hole is parallel to the second through hole.

In an embodiment, a sleeve fits around an outer wall of the first divided tube and an outer wall of the second divided tube.

With the aforementioned design, the slot is provided with the two openings on the two sides of the slot, so that after the controlling cable passes through an internal portion of a stem of the bicycle, the controlling cable could easily pass through an internal portion of a frame along the two openings of the slot, thereby hiding the controlling cable. In this way, the difficulty in hiding the controlling cable could be eased and the efficiency in hiding the controlling cable and assembling the bicycle could be improved, thereby providing a better appearance and protecting the controlling cable. Even if the number of the controlling cable is plural, a user could easily route the controlling cables into the slot.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
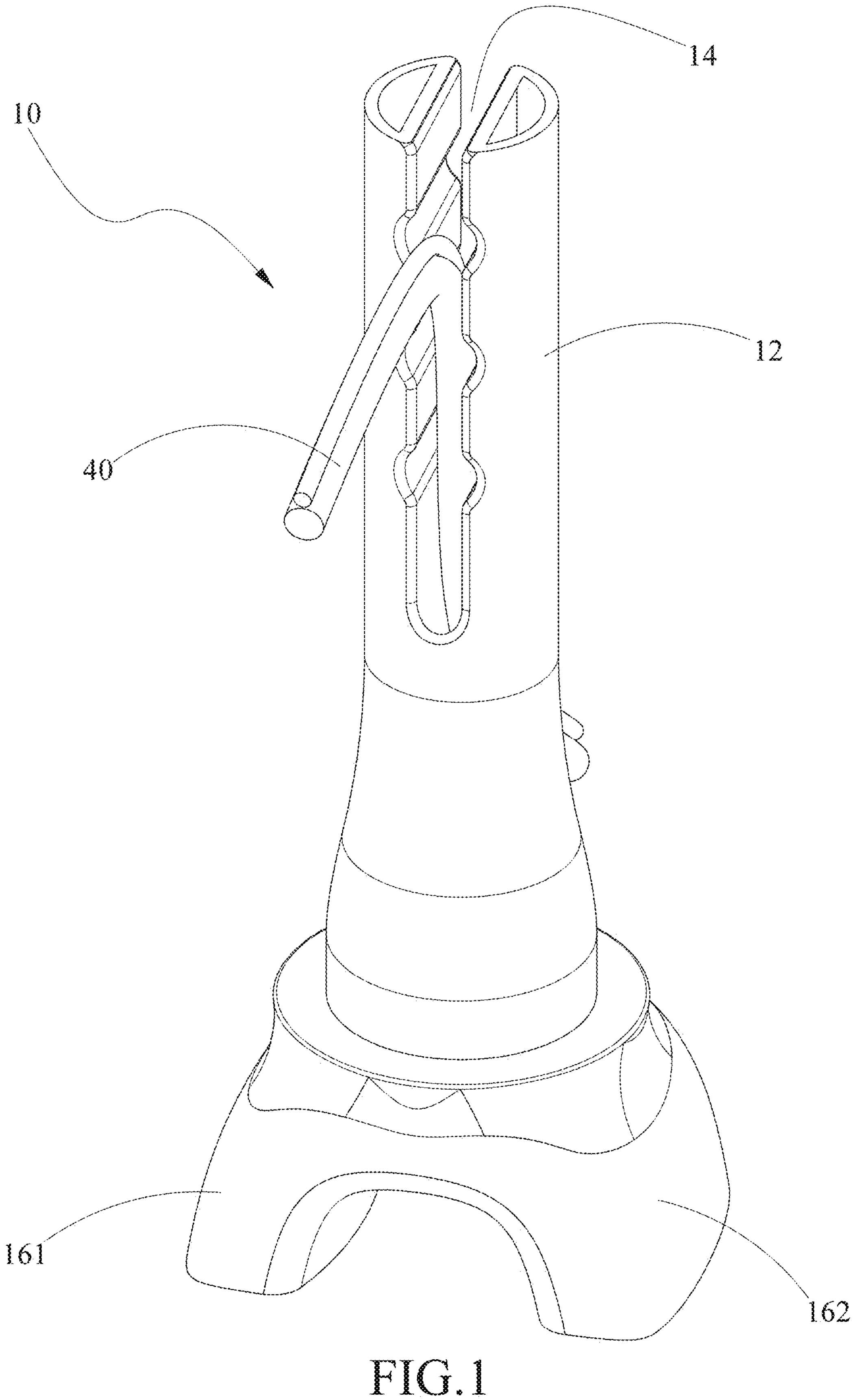
FIG. 1 is a perspective view of the bicycle fork structure according to a first embodiment of the present disclosure.
Figure 2:
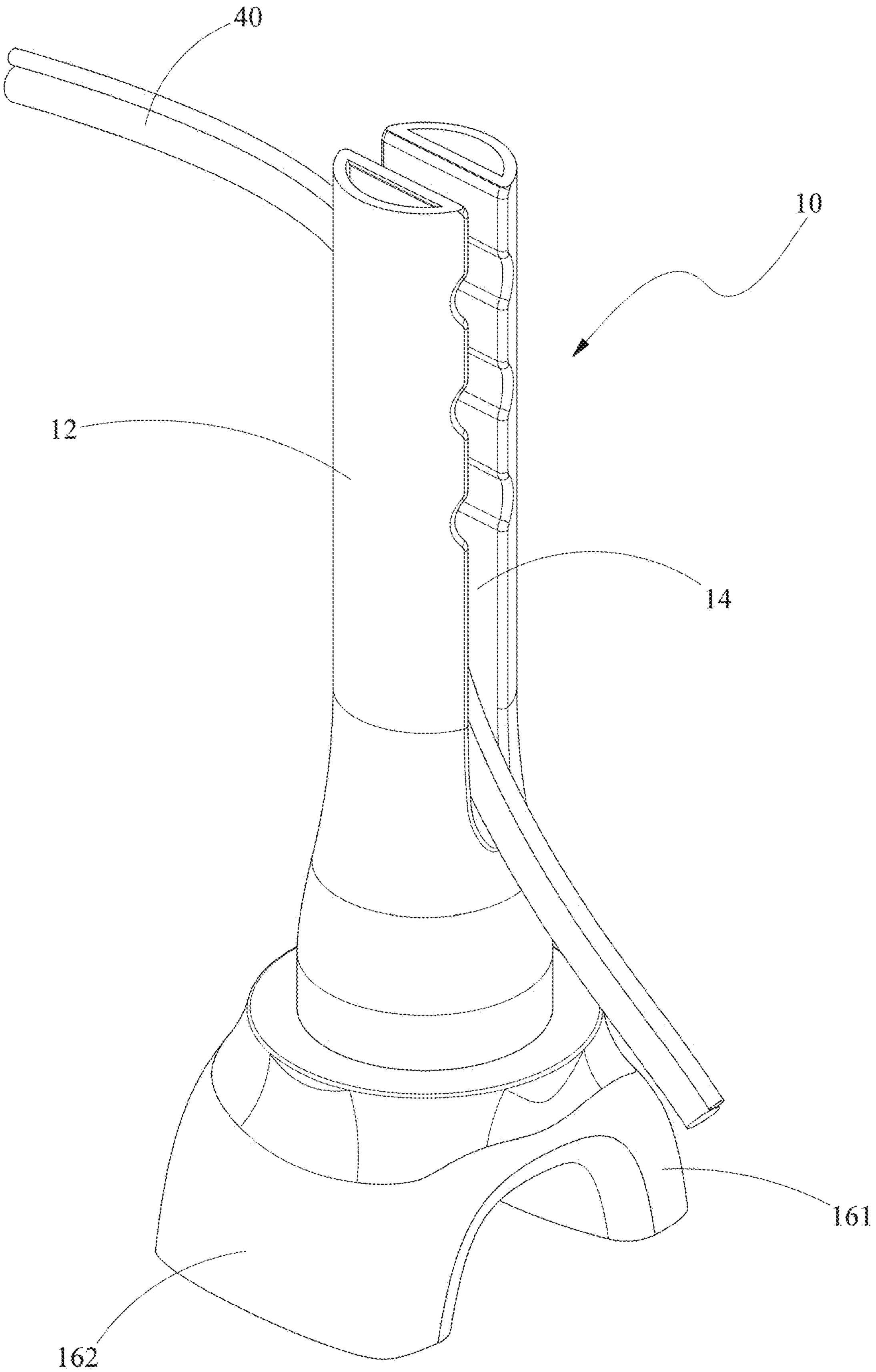
FIG. 2 is a perspective view of the bicycle fork structure according to a first embodiment of the present disclosure seen from another perspective.

A bicycle fork structure according to a first embodiment of the present disclosure is illustrated in FIG. 1 to FIG. 6 and is a fork 10 including a steerer tube 12, a first crown 161 and a second crown 162. The steerer tube 12, the first crown 161, and the second crown 162 are integrally formed as a monolithic unit. The fork 10 is a carbon-fiber structure. An end of the steerer tube 12 opens along a vertical direction from an end surface of the steerer tube 12 to form a slot 14 with two openings that are respectively located on two sides of the slot 14. Another end of the steerer tube 12 is connected to an end of the first crown 161 and an end of the second crown 162. The first crown 161 and the second crown 162 are respectively located on another two sides of the slot 14 that are not provided with the openings. As the two sides of the slot 14 are formed as the two openings of the slot 14, at least one controlling cable 40 could pass into and pass out of the slot 14 via the two openings of the two sides of the slot 14. Moreover, even if the number of the controlling cable 40 is plural, the controlling cables 40 could easily pass through the slot 14.

Figure 3:
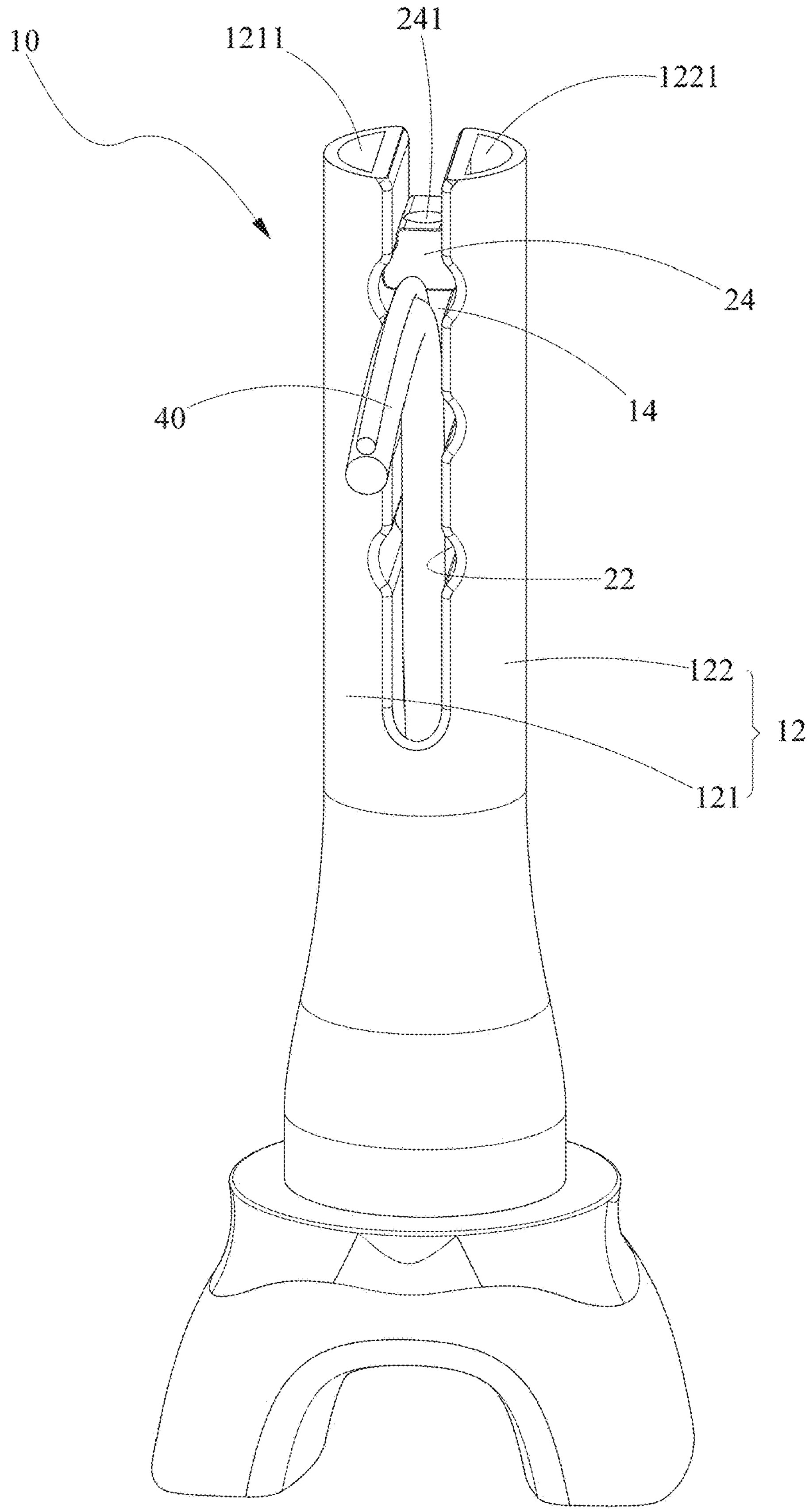
FIG. 3 is a perspective schematic view, showing the bicycle fork structure is provided with the restricting member according to the first embodiment of the present disclosure.

Referring to FIG. 3 · the steerer tube 12 forms a first divided tube 121 and a second divided tube 122 respectively on the another two sides of the slot 14. An inner surface of the first divided tube 121 and/or an inner surface of the second divided tube 122, which correspond(s) to the slot 14, recess(es) to form a plurality of restricting grooves 22, wherein each of the restricting grooves 22 extends along a lateral direction to an edge of the inner surface of the first divided tube 121 and/or an edge of the inner surface of the second divided tube 122. Preferably, the restricting grooves 22 are arranged at intervals on the inner surface of the first divided tube 121 and the inner surface of the second divided tube 122, wherein the restricting grooves 22 on the inner surface of the first divided tube 121 and the restricting grooves 22 on the inner surface of the second divided tube 122 are disposed symmetrically.

A restricting member 24 could be selectively engaged between the restricting grooves 22. When the restricting member 24 is disposed between the restricting grooves 22, the restricting member 24 could serve as a stop block to prevent the at least one controlling cable 40 from moving. As the at least one controlling cable 40 passes through the slot 14, a position of the at least one controlling cable 40 could be restricted by adjusting and disposing the restricting member 24 in different restricting grooves 22, thereby restricting the position and an extension direction of the at least one controlling cable 40 and hence preventing the at least one controlling cable 40 from moving. In other words, when the restricting member 24 passes through the restricting grooves 22 that are closer to the first crown 161 and the second crown 162, a movable range of the at least one controlling cable 40 within the slot 14 is smaller. Additionally, the restricting member 24 could maintain a distance between the first divided tube 121 and the second divided tube 122, thereby preventing an interval of the slot 14 from shortening when the fork 10 is used for a long time to make the first divided tube 121 and the second divided tube 122 approach each other.

Referring to FIG. 3, a first through hole 1211 penetrates through the first divided tube 121 along the vertical direction, and a second through hole 1221 penetrates through the second divided tube 122 along the vertical direction, wherein the first through hole 1211 is parallel to the second through hole 1221. With the first through hole 1211 and the second through hole 1221, the overall weight of the fork 10 could be reduced.

Figure 4:
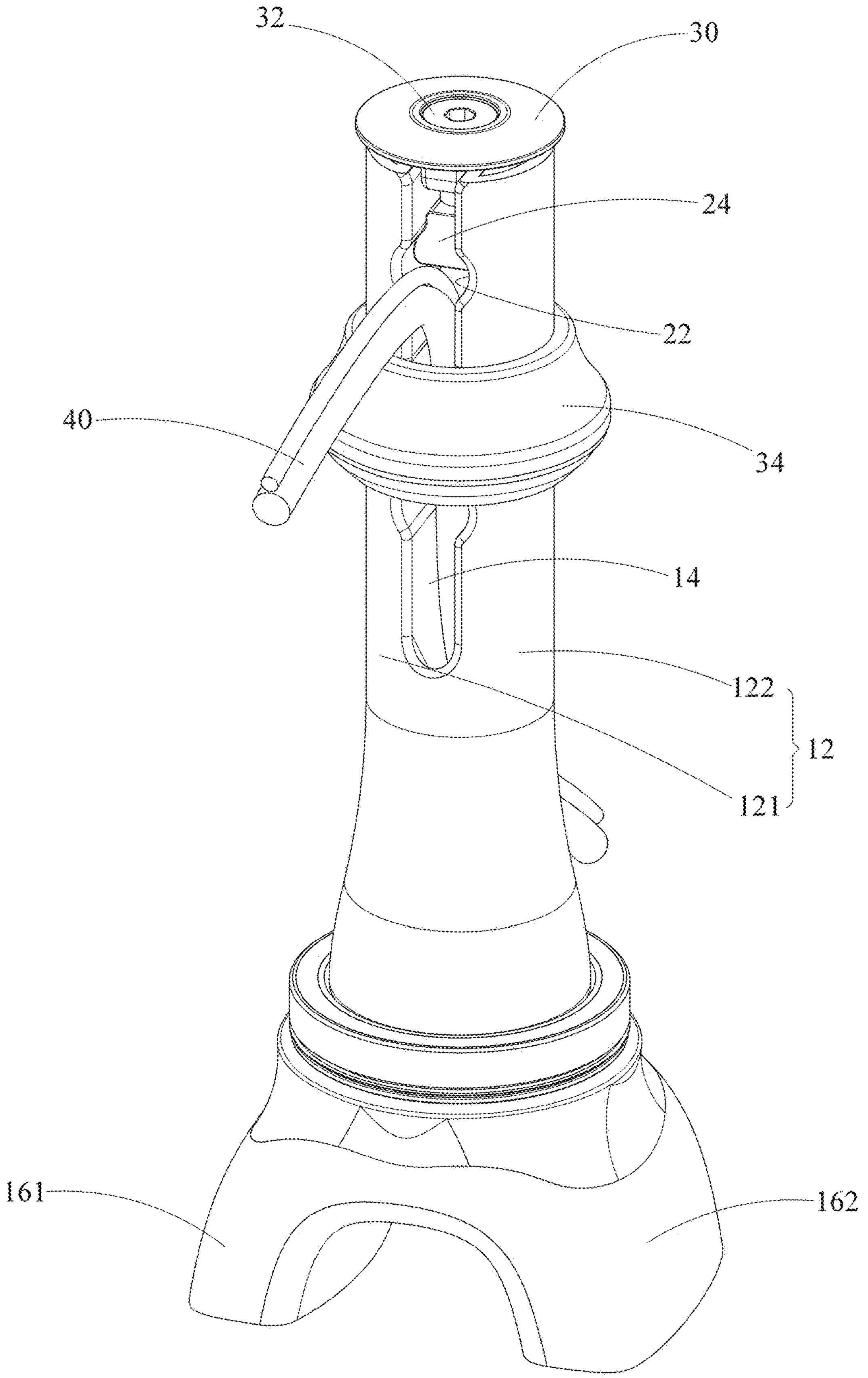
FIG. 4 is a perspective schematic view, showing the bicycle fork structure is provided with the cover and the sleeve according to the first embodiment of the present disclosure.

Referring to FIG. 3 and FIG. 4, a restricting hole 241 penetrates through the restricting member 24 along the vertical direction. A cover 30 is disposed on a top of the first divided tube 121 and a top of the second divided tube 122. A fixing member 32 penetrates through the cover 30, wherein an end of the fixing member 32 is restricted in the restricting hole 241, thereby fixing the cover 30. The cover 30 provides a dustproofing and waterproofing effect.

A sleeve 34 fits around an outer wall of the first divided tube 121 and an outer wall of the second divided tube 122. The sleeve 34 provides a restricting effect, i.e., the first divided tube 121 and the second divided tube 122 could be prevented from bending or expanding outward and a space that the at least one controlling cable 40 could move toward a bottom of the slot 14 could be limited.

Referring to FIG. 1 to FIG. 5, a headtube 50 and a frame 52 of the bicycle are integrally formed as a monolithic body. An internal portion of the frame 52 is hollow. The steerer tube 12 of the fork 10 passes through the headtube 50. A stem 54 fits around a top end of the steerer tube 12 of the fork 10. A handlebar 56 of the bicycle is disposed on an end of the stem 54, which is opposite to another end of the stem 54 engaged with the fork 10. An internal portion of the stem 54 is hollow. The two openings of the two sides of the slot 14 are disposed respectively in a direction corresponding to the stem 54 and in a direction corresponding to the frame 52.

Figure 5:
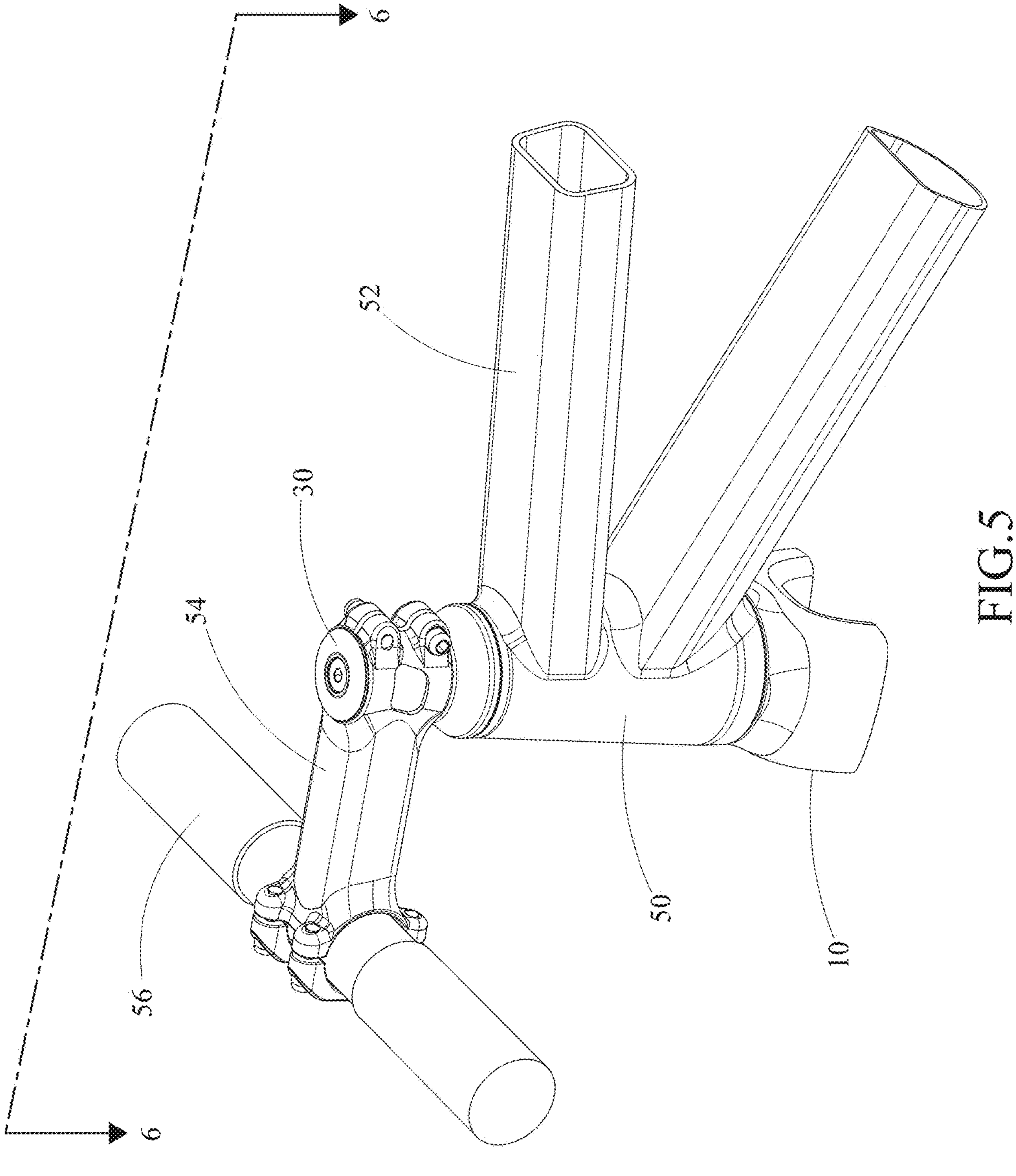
FIG. 5 is a perspective schematic view, showing the bicycle fork structure is provided with the headtube and the stem according to the first embodiment of the present disclosure.
Figure 6:
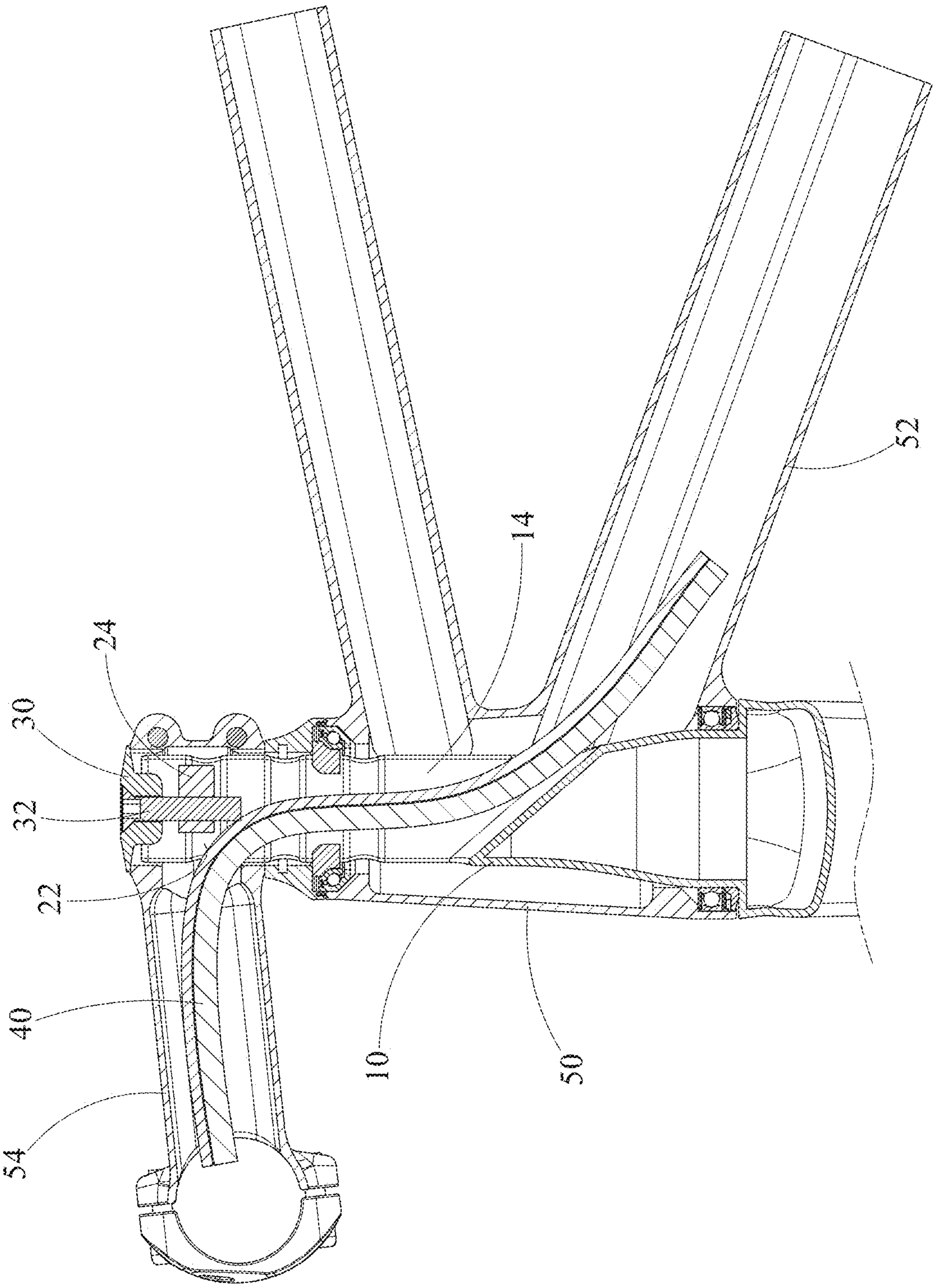
FIG. 6 is a sectional schematic view along the 6-6 line in FIG. 5.

Referring FIG. 5 and FIG. 6, as the two openings of the two sides of the slot 14 are disposed respectively in the direction corresponding to the stem 54 and in the direction corresponding to the frame 52, the at least one controlling cable 40 could smoothly pass through the internal portion of the stem 54 and the two openings of the two sides of the slot 14 and then enter the internal portion of the frame 52, thereby hiding the at least one controlling cable 40. During hiding the at least one controlling cable 40, the at least one controlling cable 40 could be routed without the influence of the other components of the bicycle. The present disclosure could ease the difficulty in hiding the at least one controlling cable 40 and hence improve the efficiency in hiding the at least one controlling cable 40 and assembling the bicycle, thereby providing a better appearance and protecting the at least one controlling cable 40 at the same time. Moreover, the slot 14 are provided with the two openings at the two sides of the slot 14, so that even if the at least one controlling cable 40 includes a plurality of controlling cables 40, a user could easily route the controlling cables 40 from the stem 54 to one of the two openings of the slot 14, which corresponds to the stem 54, and then pass the controlling cable 40 through the other opening of the slot 14, which corresponds to the frame 52, for entering the internal portion of the frame 52.

Figure 7:
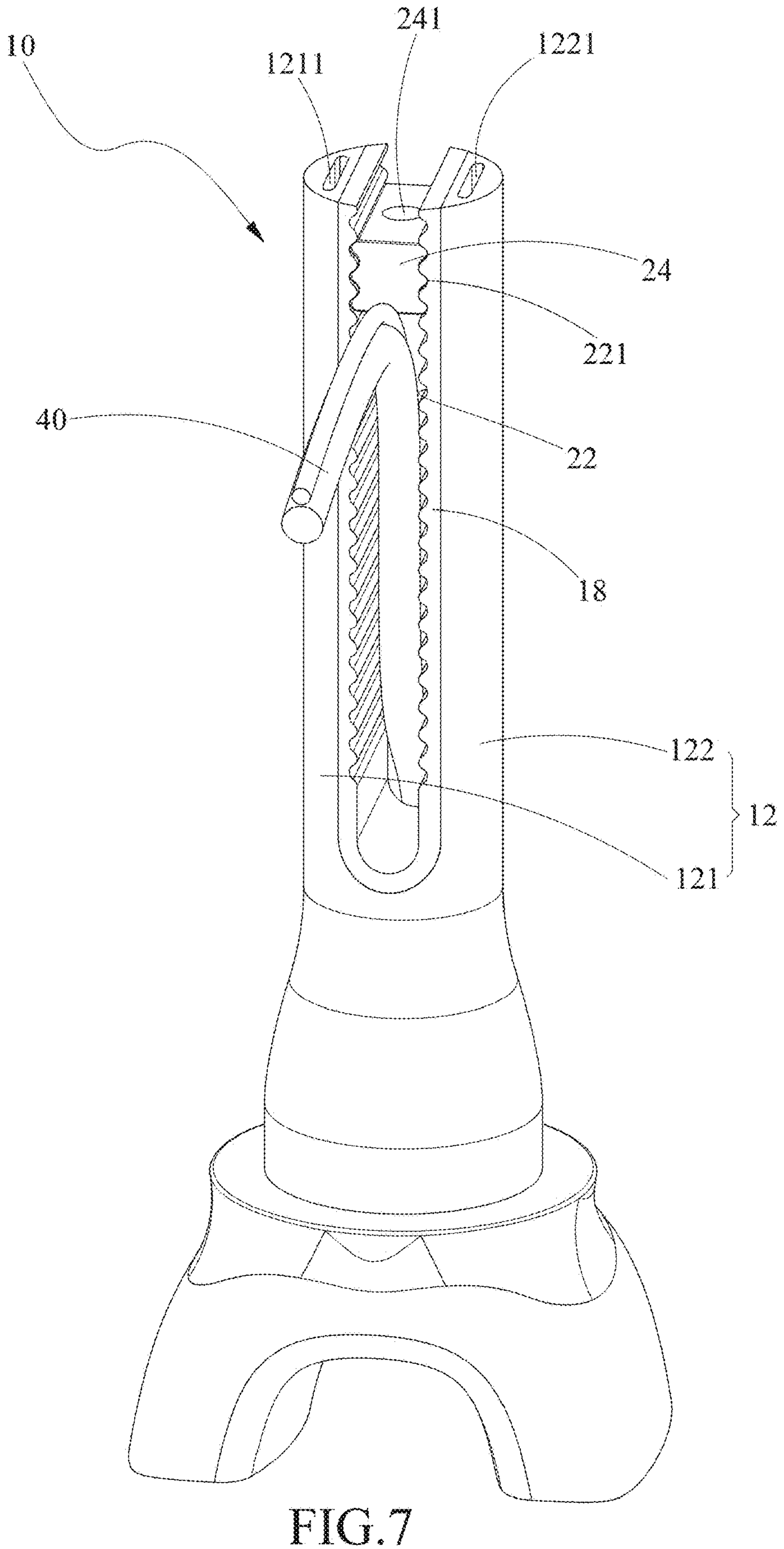
FIG. 7 is a perspective schematic view, showing the bicycle fork structure is provided with the restricting member according to a second embodiment of the present disclosure.
Figure 8:
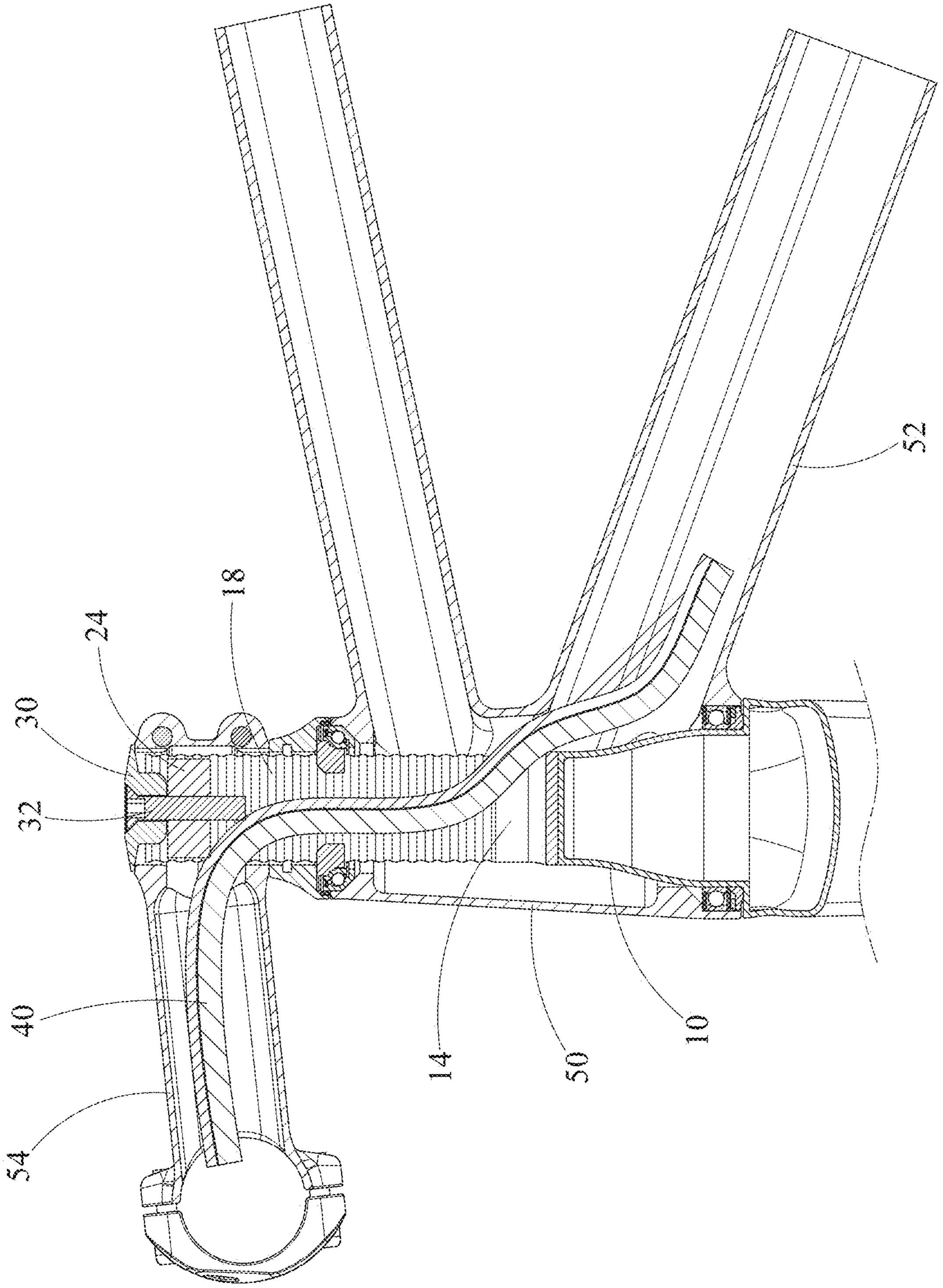
FIG. 8 is a perspective schematic view, showing the bicycle fork structure is provided with the headtube and the stem according to the second embodiment of the present disclosure.

A second embodiment of the present disclosure is illustrated in FIG. 7 and FIG. 8. A difference between the second embodiment and the first embodiment is that in the second embodiment, a U-shaped core 18 which is made of metal is disposed a surface of the first divided tube 121 and a surface of the second divided tube 122 that are adjacent to each other. A surface of the U-shaped core 18 recesses along the lateral direction to form a plurality of restricting grooves 22 having the same radius and arranged along the vertical direction. A restricting member 24 is engaged with at least one group of the restricting grooves 22 that is corresponding. Two side edges of the restricting member 24 that correspond to the restricting grooves 22 form a plurality of protrusions 221, wherein the protrusions 221 are correspondingly disposed in the restricting grooves 22. The U-shaped core 18 is made of metal, which is different from the steerer tube 12 made of carbon fibers. The U-shaped core 18 could enhance the structural strength of the steerer tube 12, so that the interval of the slot 14 could remain unchanged without significantly increasing the weight of the fork 10. Moreover, the restricting member 24 of the second embodiment could similarly maintain the distance between the first divided tube 121 and the second divided tube 122, thereby preventing the interval of the slot 14 from shortening when the fork 10 is used for a long time to make the first divided tube 121 and the second divided tube 122 approach each other.

Figure 9:
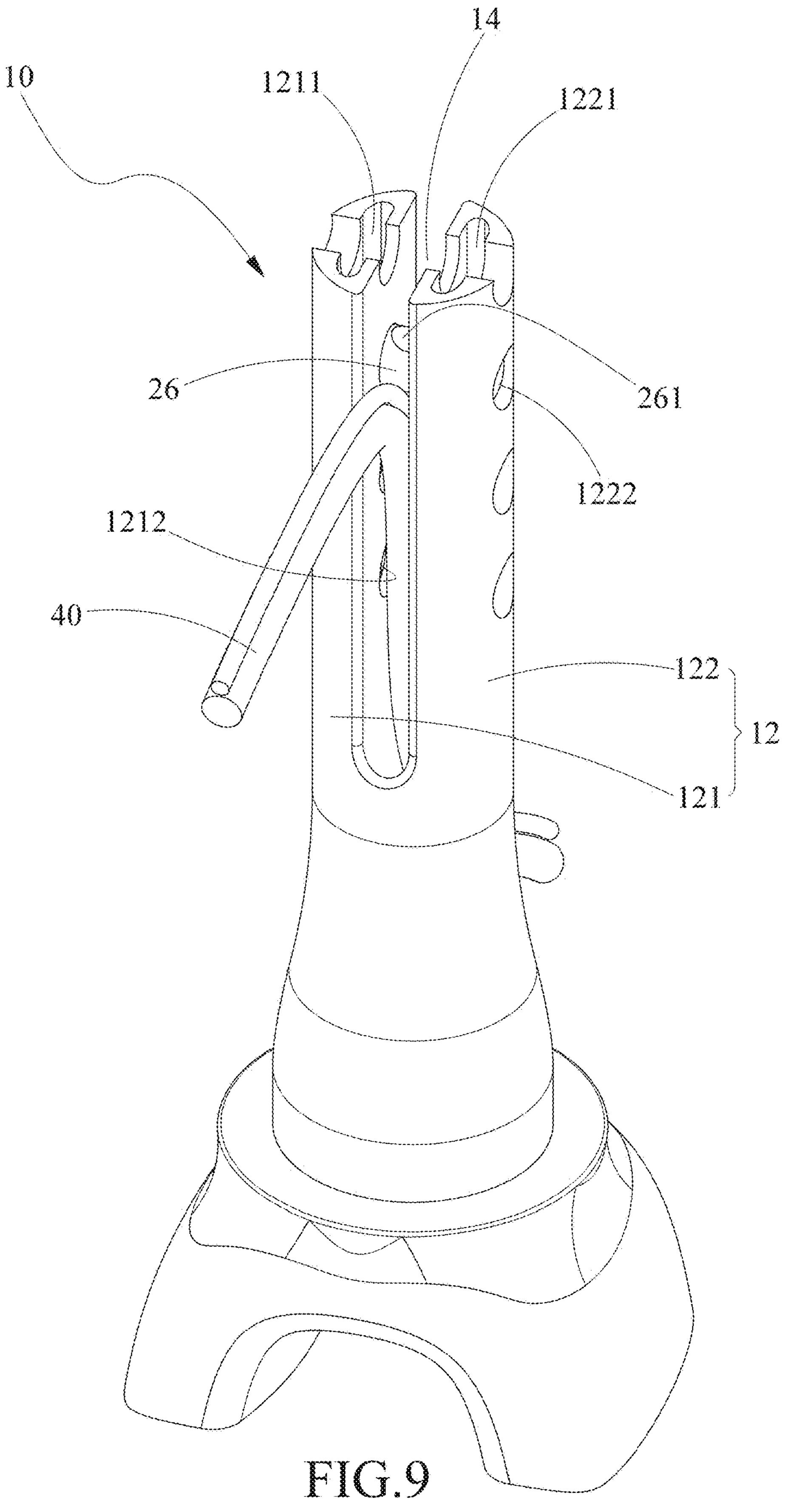
FIG. 9 is a perspective schematic view, showing the bicycle fork structure is provided with the inserting member according to a third embodiment of the present disclosure.
Figure 10:
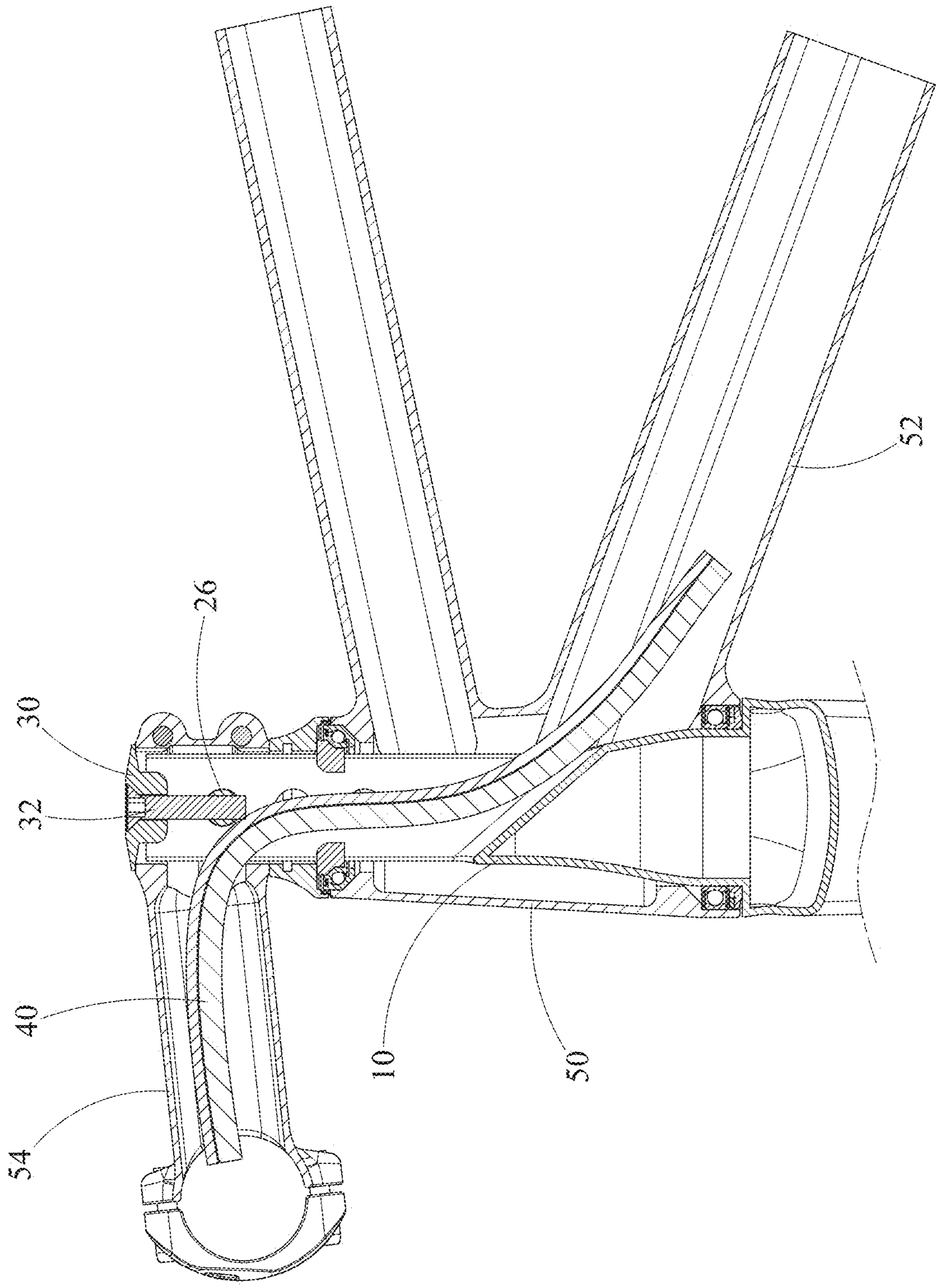
FIG. 10 is a perspective schematic view, showing the bicycle fork structure is provided with the headtube and the stem according to the third embodiment of the present disclosure.

A third embodiment of the present disclosure is illustrated in FIG. 9 and FIG. 10. A difference between the third embodiment and the first embodiment is that in the third embodiment, a plurality of third through holes 1212 penetrates through the first divided tube 121 along the lateral direction and is arranged along the vertical direction, and a plurality of fourth through holes 1222 penetrates through the second divided tube 122 along the lateral direction and is arranged in correspondence to positions of the third through holes 1212. An inserting member 26 is selectively disposed between at least one of the third through holes 1212 and at least one of the fourth through holes 1222 corresponding to the at least one third through hole 1212 of the third through holes 1212, wherein two ends of the inserting member 26 are respectively inserted into the at least one third through hole 1212 and the at least one fourth through hole 1222 that is corresponding. In this way, the inserting member 26 could achieve the effect the same as the restricting member 24.

Furthermore, an inserting hole 261 penetrates through the inserting member 26 along the vertical direction. The cover 30 could be similarly disposed on the top of the first divided tube 121 and the top of the second divided tube 122, wherein the cover 30 is restricted in the inserting hole 261 by the fixing member 32. The aforementioned structure provides another way of fixing the first divided tube 121 and the second divided tube 122 and could similarly restrict the movement of the at least one controlling cable 40.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A bicycle fork structure, comprising:

a fork comprising a steerer tube, a first crown, and a second crown that are integrally formed as a monolithic unit;

wherein an end of the steerer tube opens along a vertical direction to form a slot with two openings that are respectively located on two sides of the slot; another end of the steerer tube is connected to an end of the first crown and an end of the second crown; the first crown and the second crown are respectively located on another two sides of the slot that are not provided with the two openings; the slot is adapted to receive at least one controlling cable;

wherein the steerer tube forms a first divided tube and a second divided tube respectively on the another two sides of the slot; a U-shaped core is disposed on a surface of the first divided tube and a surface of the second divided tube that are adjacent to each other; a plurality of restricting grooves is formed by recessing in a lateral direction into a surface of the U-shaped core and is arranged along the vertical direction; a restricting member is engaged with at least one group of the plurality of restricting grooves that is corresponding.

2. The bicycle fork structure as claimed in claim 1, wherein the U-shaped core is made of metal.

3. The bicycle fork structure as claimed in claim 1, wherein a restricting hole penetrates through the restricting member along the vertical direction; a cover is disposed on a top of the first divided tube and a top of the second divided tube; the cover is restricted in the restricting hole through a fixing member.

4. The bicycle fork structure as claimed in claim 3, wherein two side edges of the restricting member corresponding to the plurality of restricting grooves form a plurality of protrusions; the plurality of protrusions are correspondingly disposed in the plurality of restricting grooves.

5. The bicycle fork structure as claimed in 1, wherein a first through hole penetrates through the first divided tube along the vertical direction; a second through hole penetrates through the second divided tube along the vertical direction; the first through hole is parallel to the second through hole.

6. The bicycle fork structure as claimed in claim 5, wherein the fork is made of carbon fibers.

7. A bicycle fork structure, comprising:

a fork comprising a steerer tube, a first crown, and a second crown that are integrally formed as a monolithic unit;

wherein an end of the steerer tube opens along a vertical direction to form a slot with two openings that are respectively located on two sides of the slot; another end of the steerer tube is connected to an end of the first crown and an end of the second crown; the first crown and the second crown are respectively located on another two sides of the slot that are not provided with the two openings; the slot is adapted to receive at least one controlling cable;

wherein the steerer tube forms a first divided tube and a second divided tube respectively on the another two sides of the slot; a plurality of third through holes penetrates through the first divided tube along a lateral direction and is arranged along the vertical direction; a plurality of fourth through holes penetrates through the second divided tube along the lateral direction and is arranged in correspondence to positions of the plurality of third through holes; an inserting member is disposed between at least one of the plurality of third through holes and at least one of the plurality of fourth through holes that corresponds to the at least one third through hole of the plurality of third through holes; two ends of the inserting member are respectively inserted into the at least one third through hole of the plurality of third through holes and the at least one fourth through hole of the plurality of fourth through holes that is corresponding.

8. The bicycle fork structure as claimed in claim 7, wherein a sleeve fits around an outer wall of the first divided tube and an outer wall of the second divided tube; an inserting hole penetrates through the inserting member along the vertical direction; a cover is disposed on a top of the first divided tube and a top of the second divided tube; the cover is restricted in the inserting hole by a fixing member.

* * * * *